United States Patent [19]

Kurashige et al.

[11] Patent Number: 5,075,268

[45] Date of Patent: Dec. 24, 1991

[54] REGENERATION METHOD FOR METHANOL-REFORMING CATALYST

[75] Inventors: Mitsuhiko Kurashige, Tsukuba; Makoto Takiguchi; Noriko Matsuo, both of Inashiki, all of Japan

[73] Assignees: Agency of Industrial Science and Technology; Extra Ministerial Bureau of Ministry of International Trade and Industry, Tokyo, Japan

[21] Appl. No.: 648,525

[22] Filed: Jan. 30, 1991

[30] Foreign Application Priority Data

May 25, 1990 [JP] Japan ................................ 2-134186

[51] Int. Cl.$^5$ .................... B01J 23/94; B01J 38/14; C01B 1/13
[52] U.S. Cl. ............................ 502/52; 423/415 A; 423/648.1; 502/38; 502/49
[58] Field of Search ..................... 502/52, 49, 38; 423/415 A, 648.1

[56] References Cited

U.S. PATENT DOCUMENTS

| | | | |
|---|---|---|---|
| 4,676,972 | 6/1987 | Velenyi et al. | 423/648 R |
| 4,780,300 | 10/1988 | Yokoyama et al. | 423/415 A |
| 4,855,267 | 8/1989 | Cheng | 502/50 |

Primary Examiner—Paul E. Konopka
Attorney, Agent, or Firm—Cushman, Darby & Cushman

[57] ABSTRACT

Disclosed herein is a method for the regeneration of a methanol-reforming catalyst reduced in activity due to its use in a reaction in which methanol is modified, in the presence of water if necessary, to produce a hydrogen-containing gas. The catalyst contains copper as a principal component and at least one metal selected from the group consisting of zinc, nickel, chromium and aluminum. The method comprises exposing the catalyst to an atmosphere having a temperature of 120°–650° C. and a molecular oxygen concentration not higher than 5 mole %.

2 Claims, No Drawings

REGENERATION METHOD FOR METHANOL-REFORMING CATALYST

BACKGROUND OF THE INVENTION

1. Field of the Invention

The present invention relates to the regeneration of a methanol-reforming catalyst. More specifically, this invention is concerned with a method for the simple and easy regeneration of a catalyst which has been used in the production of a hydrogen-containing gas by reforming of methanol, if necessary, in the presence of water.

2. Description of the Prior Art

In the presence of a catalyst, methanol can be rather easily reformed into a gas composed principally of hydrogen or, in the presence of water, into a gas having a still higher hydrogen content. (The latter reforming may be specifically called "steam reforming". The term "reforming" as used herein should however be interpreted as embracing not only reforming in the absence of water but also reforming in the presence of water except for cases where specific reference to steam reforming is needed.)

Numerous catalysts have heretofore been proposed for the reforming of methanol, including catalysts with a platinum-group metal such as platinum or vanadium supported on a carrier such as alumina, catalysts with one or more of the base metals of groups IB, IIB, IVA and VIII of the periodic table—such as copper, nickel, chromium and zinc—supported on such a carrier, and catalysts composed of one or more of the oxides of such base metals.

Among these, catalysts containing copper as a principal component include the following proposals:

(1) Catalysts containing copper oxide and chromium oxide as principal ingredients and also the oxides of manganese, barium and the like (see Japanese Patent Publication No. 11274/1979).

(2) Catalysts containing copper oxide and zinc oxide as principal components and also chromium oxide (see Japanese Patent Laid-Open No. 174138/1982) or also aluminum oxide, manganese oxide, boron oxide and the like (see Japanese Patent Laid-Open No. 131501/1984).

(3) Catalysts containing copper oxide, nickel oxide and aluminum oxide as principal components and also lithium, sodium, potassium and the like (see Japanese Patent Laid-Open No. 224046/1989).

(4) Coprecipitated, copper-containing, two-component catalysts such as copper/aluminum oxide [see H. Kobayashi, N. Takezawa and C. Minochi, Chem. Lett., 1347 (1976)].

To the best knowledge of the present inventors, these copper-containing catalysts are however accompanied by the problem that their activity and selectivity are progressively reduced when a long-term, continuous operation is practiced.

SUMMARY OF THE INVENTION

Object of the Invention

An object of the present invention is therefore to provide a method for regenerating a methanol-reforming, copper-containing catalyst which activity has been lowered, whereby the catalyst is reactivated to substantially prolong its life.

Disclosure of the Invention

The present invention has been completed with a view toward overcoming the problem described above. As a result of an extensive investigation, the present inventors have found that the activity of a copper-containing catalyst, whose activity has been lowered as a result of its use in a reaction for the reforming of methanol or a mixture of methanol and water, can be substantially restored by oxidizing it under particular conditions, leading to the completion of the present invention.

In one aspect of the present invention, there is thus provided a method for the regeneration of a methanol-reforming catalyst reduced in activity due to its use in a reaction in which methanol is reformed, in the presence of water if necessary, to produce a hydrogen-containing gas, said catalyst comprising copper as a principal component and at least one metal selected from the group consisting of zinc, nickel, chromium and aluminum, which comprises exposing the catalyst to an atmosphere having a temperature of 120°–650° C. and a molecular oxygen concentration not higher than 5 mole %.

According to the present invention, a methanol-reforming catalyst whose activity has been lowered as a result of its use in reforming reaction can be reactivated and the activity and selectivity of the catalyst can be retained over a long time, thereby making it possible to substantially prolong its life. In addition, the degree of regeneration of its activity is high so that the catalyst can be regenerated with substantially the same activity as its activity at the beginning of its use.

In general, principal causes for reduced activity of copper-containing catalysts are considered to include sintering of copper, deposition of carbon, deposition of flammable matter, etc. (see Japanese Patent Laid-Open Nos. 127601/1986 and 70201/1987).

As will be understood from the measurement data of specific surface area and the analysis data of carbon content to be given in Example 1, Table 4, redispersion of sintered copper cristallites cannot be occurred and the amount of deposited carbon remains unchanged both before and after regeneration when the regeneration method of the present invention is practiced.

The present inventors believe that a component composed principally of copper having low valency is the so-called high-activity source of a copper-containing catalyst and a reduction in activity takes place by further lowering of the valency of the high-activity source close to the state of zero valency due to its use over a long time.

The regeneration method according to the present invention is therefore believed to allow the active component, which is composed principally of copper, to restore its valency.

Catalysts which are employed in a reducing atmosphere as in the present reforming reaction may lower their strength and may hence break into powder. They accordingly have the potential problem that they may block a reactor tube. No difference is however observed between the crushing strength of a catalyst before its regeneration by the method of the present invention and that of the same catalyst after the regeneration.

The restoration of the catalytic activity by the present invention is therefore attributed most likely to oxidation. It is however believed to be totally unexpected that the atmosphere for the oxidation must contain oxygen at a low concentration.

DETAILED DESCRIPTION OF THE INVENTION

Methanol-Reforming Catalysts

Catalysts to which the regeneration method of the present invention can be applied are methanol-reforming catalysts containing copper as a principal component and also at least one metal selected from the group consisting of zinc, nickel, chromium and aluminum. In addition, the regeneration method of this invention can also be applied to methanol-reforming catalysts which contains, in addition to copper and one or more metals selected from zinc, nickel, chromium and aluminum, one or more metals other than the aforementioned metals. Specific examples include the catalysts (1)–(4) referred to above. These metal components can be supported on a suitable carrier.

These metal components, especially, copper as the principal catalyst component may take an oxide form. The other metals, for example, aluminum is generally in an oxide form. However, aluminum oxides, in particular, alumina may probably act as a carrier. Since no practical benefit is believed to be brought about from a distinction as to whether a particular component acts as a source for the catalytic activity or as a carrier in a catalyst, such a distinction will not be made in this invention with respect to at least the above-described metal components.

Such catalysts can be produced by a process known per se in the art or conforming with the their objects. Coprecipitation can be mentioned as one of such production processes. This process comprises causing, for example, a water-soluble salt of a metal, which should form a hydroxide with an alkali, to precipitate optionally together with a compound of the same kind capable of yielding a carrier or in the presence of carrier particles and then heating the resultant coprecipitate to decompose the hydroxide so formed. Another suitable process is calcination. This process comprises impregnating carrier particles, for example, with water-soluble compounds of these metals, said compounds being capable of yielding oxides when heated, and then decomposing the compounds. Whichever process is employed, it is preferred in many instances to use a catalyst, which is composed of one or more oxides, after lightly reducing it.

These copper-containing catalysts are used by a method known per se to produce a reformed gas containing hydrogen from methanol or both methanol and water as raw material or raw materials. In general, these catalysts are progressively reduced in activity as the operation time goes on. The regeneration method according to the present invention can be applied to the above-described copper-containing catalysts whose activities have been lowered as a result of continuation of a reforming operation. No particular limitation is imposed on the degree of reduction in activity. The regeneration method of this invention can be applied to such copper-containing catalysts, including from those of such a stage that their activities have been lowered only to slight extent to those of such a stage that their activities have been lost to significant extent.

Regeneration Method

The regeneration method according to the present invention is conducted by exposing one of the copper-containing catalysts described above, said catalyst having been reduced in activity, to an atmosphere having a temperature of 120°–650° C., preferably 150°–620° C. and a molecular oxygen concentration not higher than 5 mole %. No other limitations are imposed on the composition of the atmosphere gas, because it contains molecular oxygen in a desired amount as long as the concentration of molecular oxygen is not higher than 5 mole %. An inert gas, for example, a rare gas, nitrogen gas or steam containing not more than 5 mole % of oxygen can be used preferably.

Regeneration can be conducted in the state that the catalyst is contained in a reactor. As an alternative, to improve the efficiency of the regeneration treatment, it is also possible to take the catalyst out, for example, in a nitrogen atmosphere to avoid its exposure to oxygen in the air and then to regenerate it in a treatment system designed exclusively for the regeneration.

No particular limitation is imposed on the flow rate of the atmosphere gas which is brought into contact with a bed of the catalyst, as long as the composition of the atmosphere described above can be maintained. A higher flow rate is however generally more preferred from the viewpoint that the removal of heat of oxidation from the catalyst can be conducted effectively.

The atmosphere gas can also be introduced while changing the concentration of oxygen stepwise from a low concentration to a high concentration with a view toward avoiding any abrupt rise of the temperature of the catalyst.

The time for which the catalyst is exposed to the above-described atmosphere can be set suitably, depending on the temperature, the concentration of oxygen, the amount of the catalyst, the degree of activity reduction, etc. In general, the regeneration can however be brought to completion in about 10 minutes to about 30 hours. Further, by changing the time for which the catalyst is subjected to the regeneration treatment, the degree of oxidation of the catalyst can be suitably chosen from complete oxidation to oxidation of such a degree that an active state is obtained as needed.

It is also possible to subject the catalyst to preliminary oxidation at a low temperature, for example, at room temperature before applying the regeneration method of the present invention.

EXAMPLES

Production of Catalysts

Reacted at 30° C. with an aqueous solution of sodium carbonate was an aqueous solution containing in combination at least one nitrate selected from zinc nitrate, nickel nitrate, aluminum nitrate, chromium nitrate and manganese nitrate and copper nitrate. The resultant precipitate was thoroughly washed, dried and then calcined at 350° C. Using a 10% hydrogen/nitrogen mixed gas, the calcined product was reduced at 300° C. for 5 hours. Stabilization was then conducted using carbon dioxide gas. Catalyst Nos. 1–9 of the compositions shown in Table 1 were obtained in the above manner.

Further, an aqueous solution containing copper nitrate and nickel nitrate in combination was reacted at 30° C. with an aqueous solution of sodium carbonate. After the resultant precipitate was thoroughly washed, a slurry of the precipitate and an alumina gel (water content: 23%) were kneaded. Sodium carbonate was added further. The resultant mass was dried under kneading, followed by calcination at 500° C. for 3 hours. The calcined product was subjected to reduction and stabilization in the same manner as described above, whereby Catalyst No. 10 of the composition given in Table 1 was obtained.

EXAMPLE 1

Using Catalyst No. 3 described above, reforming reaction was conducted under the reaction conditions shown in Table 2. The conversion of methanol was measured after elapsed times of 15 hours and 1,000 hours, whereby the activity of the catalyst was evaluated.

The catalyst was thereafter treated at the atmospheric pressure under the regeneration treatment conditions shown in Table 3, so that its regeneration treatment was conducted. Subsequent to reduction of the catalyst at 300° C. for 5 hours with a 10% hydrogen/nitrogen mixed gas, the reforming reaction was conducted again under the reaction conditions given in Table 2. After an elapsed time of 15 hours, the conversion of methanol was measured to evaluate the activity of the catalyst. The results are summarized in Table 3.

In addition, the composition of the gas (except for $H_2O$) produced using the catalyst in Table 3, said catalyst being treated under the regeneration conditions consisting of 3% oxygen concentration and 300° C. reactor temperature, and the specific surface area and carbon content of the catalyst were measured both before and after the regeneration. The results are summarized in Table 4.

EXAMPLE 2

Reforming reaction, regeneration treatment and reduction treatment were conducted using Catalyst Nos. 1, 2 and 4–10 separately under similar conditions to Example 1 except that the regeneration treatment conditions consisted of a nitrogen gas atmosphere containing oxygen at a concentration of 1 mole % and 300° C. reactor temperature. The activity of each catalyst was evaluated both before and after the regeneration in a similar manner to Example 1.

The results are summarized in Table 5.

EXAMPLE 3

Using Catalyst Nos. 3 and 10 separately, reforming reaction, regeneration treatment and reduction treatment were conducted under similar conditions to Example 1 except that the $H_2O$/methanol molar ratio of the feed to the reactor was changed to 0, in other words, methanol alone was used as the feed for the reactor. The activity of each catalyst was evaluated both before and after the regeneration in a similar manner to Example 1.

The results are summarized in Table 6.

COMPARATIVE EXAMPLE

Using Catalyst No. 3, reforming reaction, regeneration treatment and reduction treatment were conducted under similar conditions to Example 1 except that the regeneration treatment conditions were changed to the conditions given in Table 7. The activity of the catalyst was evaluated both before and after the regeneration.

The results are also shown in Table 7.

TABLE 1

| Catalyst No. | Catalyst composition | (atomic ratio) |
| --- | --- | --- |
| 1 | Cu:Al | 10:3 |
| 2 | Cu:Zn | 10:10 |
| 3 | Cu:Zn:Al | 10:10:3 |
| 4 | Cu:Zn:Al:Mn | 10:10:3:3 |
| 5 | Cu:Zn:Cr | 10:10:5 |
| 6 | Cu:Cr | 10:10 |
| 7 | Cu:Cr:Mn | 10:10:1 |
| 8 | Cu:Ni | 10:3 |
| 9 | Cu:Ni:Si | 10:3:5 |
| 10 | Cu:Ni:Al:Na | 10:3:5:0.3 |

TABLE 2

| Amount of catalyst | L.H.S.V. (methanol basis) | Temperature of reactor | Pressure | Feed for reactor (molar ratio) |
| --- | --- | --- | --- | --- |
| 10 cc | 2 hr$^{-1}$ | 300° C. | Atmospheric | $H_2O$/methanol = 1.5 |

TABLE 3

| Conditions for regeneration treatment | | Conversion of methanol (%) | | |
| --- | --- | --- | --- | --- |
| Concentration of $O_2$ in $N_2$ gas (mole %) | Temperature of reactor (°C.) | Before regeneration | | After regeneration |
| | | 15 hrs. later | 1,000 hrs. later | 15 hrs. later |
| 1 | 150 | 98 | 89 | 96 |
| 5 | | | | 96 |
| 3 | 200 | | | 98 |
| 1 | 300 | | | 98 |
| 3 | | | | 98 |
| 0.5 | 500 | | | 97 |
| 0.5 | 600 | | | 95 |
| 1 | | | | 95 |

TABLE 4

| | Before regeneration | | | | | | After regeneration | | |
| --- | --- | --- | --- | --- | --- | --- | --- | --- | --- |
| | 15 hrs. later | | | 1,000 hrs. later | | | 15 hrs. later | | |
| | $H_2$ | CO | $CO_2$ | $H_2$ | CO | $CO_2$ | $H_2$ | CO | $CO_2$ |
| Composition of produced gas (%) | 74 | 2 | 24 | 74 | 2 | 24 | 74 | 2 | 24 |
| Carbon content (wt. %) | — | | | 0.32 | | | 0.36 | | |
| Specific surface area (cm$^2$/g) | 71 | | | 48 | | | 47 | | |

TABLE 5

| Catalyst No. | Conversion of methanol (%) | | |
|---|---|---|---|
| | Before regeneration | | After regeneration |
| | 15 hrs. later | 1,000 hrs. later | 15 hrs. later |
| 1 | 90 | 65 | 90 |
| 2 | 96 | 80 | 94 |
| 3 | 98 | 89 | 98 |
| 4 | 94 | 77 | 92 |
| 5 | 92 | 75 | 92 |
| 6 | 85 | 58 | 83 |
| 7 | 81 | 53 | 80 |
| 8 | 85 | 64 | 85 |
| 9 | 87 | 63 | 87 |
| 10 | 94 | 78 | 94 |

TABLE 6

| Catalyst No. | Conversion of methanol (%) | | |
|---|---|---|---|
| | Before regeneration | | After regeneration |
| | 15 hrs. later | 1,000 hrs. later | 15 hrs. later |
| 3 | 88 | 59 | 87 |
| 10 | 87 | 65 | 84 |

TABLE 7

| Conditions for regeneration treatment | | Conversion of methanol (%) | | |
|---|---|---|---|---|
| Concentration of $O_2$ in $N_2$ gas (mole %) | Temperature of reactor (°C.) | Before regeneration | | After regeneration |
| | | 15 hrs. later | 1,000 hrs. later | 15 hrs. later |
| 7 | 300 | 98 | 89 | 90 |
| 20 | | | | 85 |
| 1 | | | | 90 |
| | 100 | | | |
| | 750 | | | 84 |
| 0 ($N_2$ gas was used) | 300 | | | 87 |

We claim:

1. A method for the regeneration of a methanol-reforming catalyst reduced in activity due to its use in a reaction in which methanol is reformed to produce a hydrogen-containing gas, said catalyst comprising copper as a principal component and at least one metal selected from the group consisting of zinc, nickel, chromium and aluminum, which comprises exposing the catalyst to an atmosphere having a temperature of 120°–650° C. and a molecular oxygen concentration not higher than 5 mole %.

2. The method of claim 1, wherein methanol is reformed in the presence of water.

* * * * *